(12) United States Patent
Becker

(10) Patent No.: US 6,226,969 B1
(45) Date of Patent: May 8, 2001

(54) CORNHEAD ROW UNIT AND STRIPPER PLATE ADJUSTING MECHANISM

(75) Inventor: Aaron T. Becker, Cambridge, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/412,161

(22) Filed: Oct. 5, 1999

(51) Int. Cl.[7] .................... A01D 45/02; A01D 45/10
(52) U.S. Cl. ......................................... 56/62; 56/98
(58) Field of Search ...................... 56/119, 500, 94, 56/66, 59, 75, 78, 82, 88, 93, 98, 111, 118, 106, 69, 62

(56) References Cited

U.S. PATENT DOCUMENTS

| | | | |
|---|---|---|---|
| 3,520,112 | * | 7/1970 | Ashton et al. ........................... 56/106 |
| 4,084,396 | * | 4/1978 | Fritz et al. .............................. 56/98 |
| 4,086,749 | * | 5/1978 | Greiner et al. .......................... 56/98 |
| 4,106,271 | * | 8/1978 | Carey et al. ............................ 56/119 |
| 4,326,590 | * | 4/1982 | Yancey .................................... 171/61 |
| 4,538,404 | * | 9/1985 | Heimark, Jr. et al. ................. 56/314 |
| 4,598,535 | * | 7/1986 | Sousek ...................................... 56/98 |
| 5,060,464 | * | 10/1991 | Caron ....................................... 56/62 |
| 5,117,618 | * | 6/1992 | Bich ......................................... 56/98 |
| 5,680,750 | * | 10/1997 | Stefl ......................................... 56/62 |
| 5,704,202 | * | 1/1998 | Calmer ................................... 56/106 |
| 5,878,561 | * | 3/1999 | Gunn ......................................... 56/98 |

* cited by examiner

Primary Examiner—Robert E. Pezzuto
Assistant Examiner—Arpad Fabian Kovacs
(74) Attorney, Agent, or Firm—Richard G. Lione; Brinks Hofer Gilson & Lione

(57) ABSTRACT

A cornhead for an agricultural combine has a plurality of row units including generally U-shaped frames. Each frame includes parallel side frame sections on which stripper plates are mounted. One of the stripper plates is adjustable transversely of the corresponding side frame section by an actuator mounted within the side frame section. The actuator includes a torque shaft operatively connected to the adjustable stripper plate through the top plate of the side section.

6 Claims, 5 Drawing Sheets

CORNHEAD ROW UNIT AND STRIPPER PLATE ADJUSTING MECHANISM

FIELD OF THE INVENTION

The invention relates in general to agricultural combines. It relates particularly to a corn harvesting header assembly for an agricultural combine.

BACKGROUND OF THE INVENTION

A corn harvesting header assembly or cornhead for an agricultural combine typically comprises a series of row units which are identical to each other. Each row unit includes a pair of snapping rolls having a snapping slot formed between them. Gathering chains having gathering fingers guide corn stalks into the snapping slot. The snapping rolls pull the corn stalks through the snapping slot and the ears are removed from the stalks as they come into engagement with opposed edges of stripper plates which bracket the slot between the gathering chains and the snapping rolls.

It is conventional for at least one of the two stripper plates to be mounted on the row unit frame for movement toward and away from the other plate. This permits the gap between the opposed stripping edges to be varied to accommodate different corn crops and crop conditions. Adjustment of the gap is typically accomplished by an adjusting mechanism including actuation levers coupled to the adjustable stripper plate. The adjusting levers are mounted on an actuation shaft extending along one side or each row unit frame and supported in brackets extending outwardly of the frame.

SUMMARY OF THE INVENTION

It is an object of the present invention to provide an improved cornhead row unit and adjusting mechanism for stripper plates.

It is another object to provide an improved adjusting mechanism for stripper plates which is simple and less expensive than existing constructions.

It is still another object to provide a simple and inexpensive adjusting mechanism in a cornhead row unit which permits narrower row unit spacing and, accordingly, use in a corn crop field planted with narrow row spacing.

The foregoing and other objects are realized in accord with the present invention by providing a row unit frame wherein an adjusting mechanism for stripper plates is contained substantially entirely inside the frame. The adjusting mechanism includes an actuation shaft which is journaled at its rear end in the back wall plate of the row unit frame. The shaft extends forwardly from the back wall plate, inside one of the two side frame sections in the row unit, longitudinally of that side frame section. It is journaled at its front end in a bracket mounted inside that side frame section.

The actuation shaft has two stripper plate adjusting arms rigidly connected to it in longitudinally spaced, radially extending relationship. Each of the two arms is operatively connected to the adjustable stripper plate through a corresponding aperture in the top plate of the side frame section.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
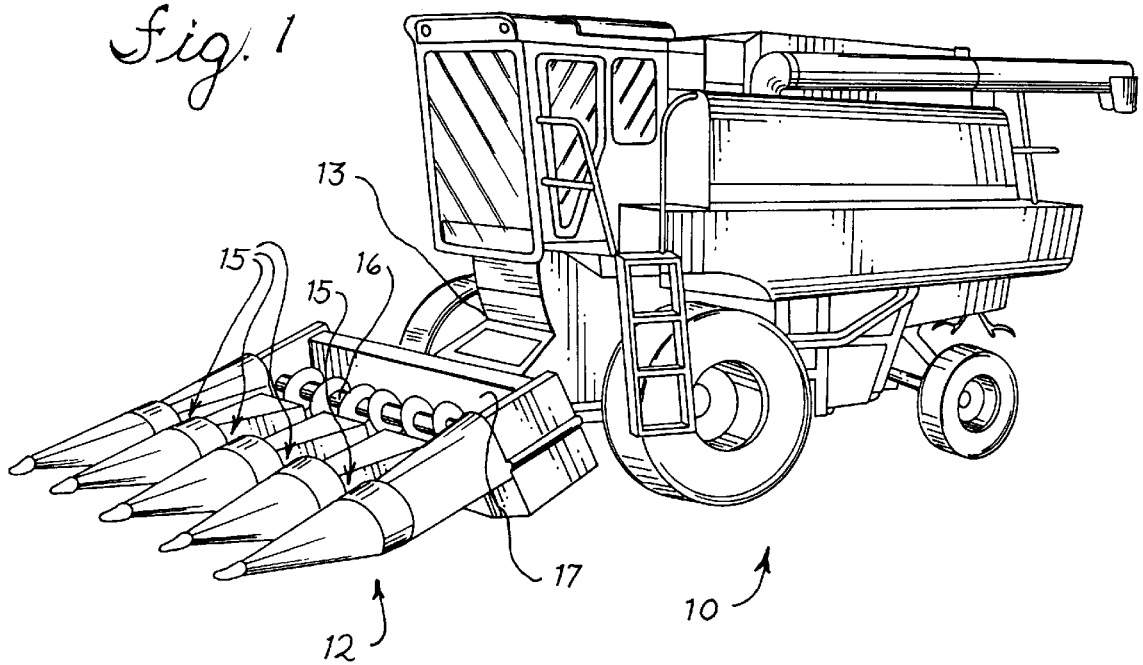
FIG. 1 is a front-side perspective view of an agricultural combine mounting a corn harvesting header assembly.

Referring now to the drawings, and particularly to FIG. 1, an agricultural combine of generally conventional construction is seen at 10. A corn harvesting header assembly or cornhead 12 is mounted on the combine 10, cantilevered in front of it and connected to the combine by a feeder assembly 13.

The header assembly 12 illustrated contains four row units 15, which harvest four rows of corn simultaneously. Ears of corn are stripped from each of the four rows by a row unit 15 and then carried by an auger 16 in the trough 17 of the header assembly 12 to the feeder assembly 13. The feeder assembly 13 carries the collected ears rearwardly and upwardly into a threshing assembly (not shown) in the body of the combine 10.

Figure 2:
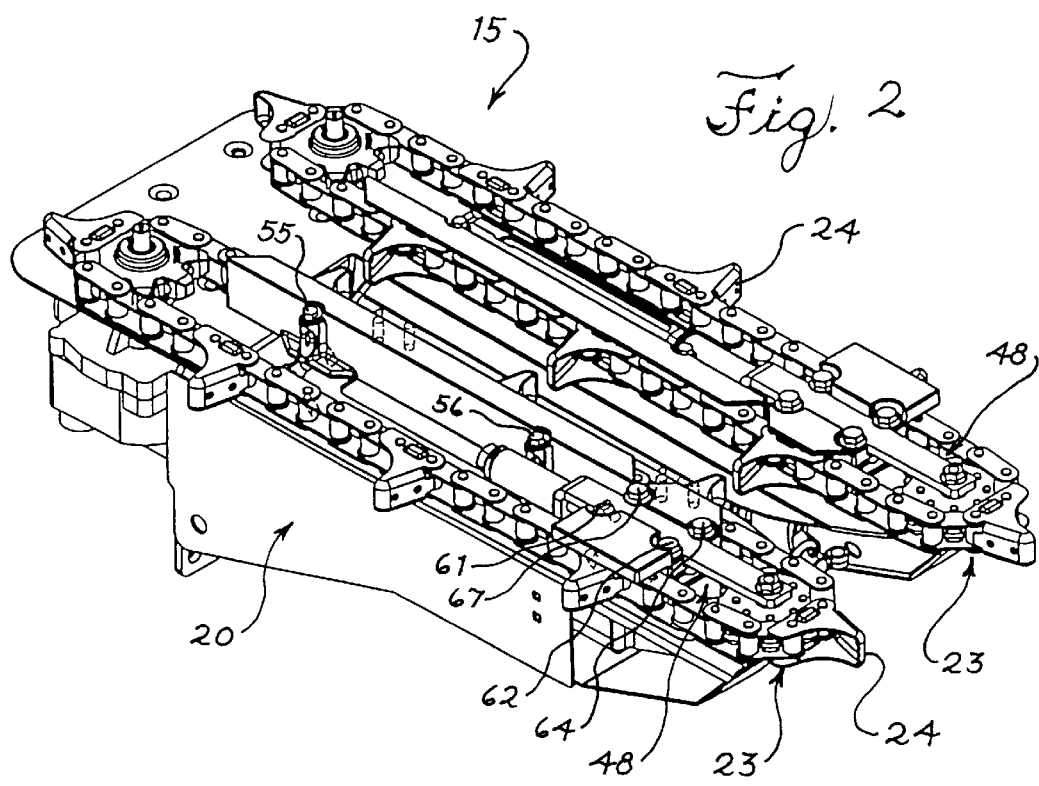
FIG. 2 is a front-side perspective view of a row unit in the corn harvesting header assembly of FIG. 1, the row unit and stripper plate adjustment mechanism incorporated therein embodying features of the present invention.
Figure 3:
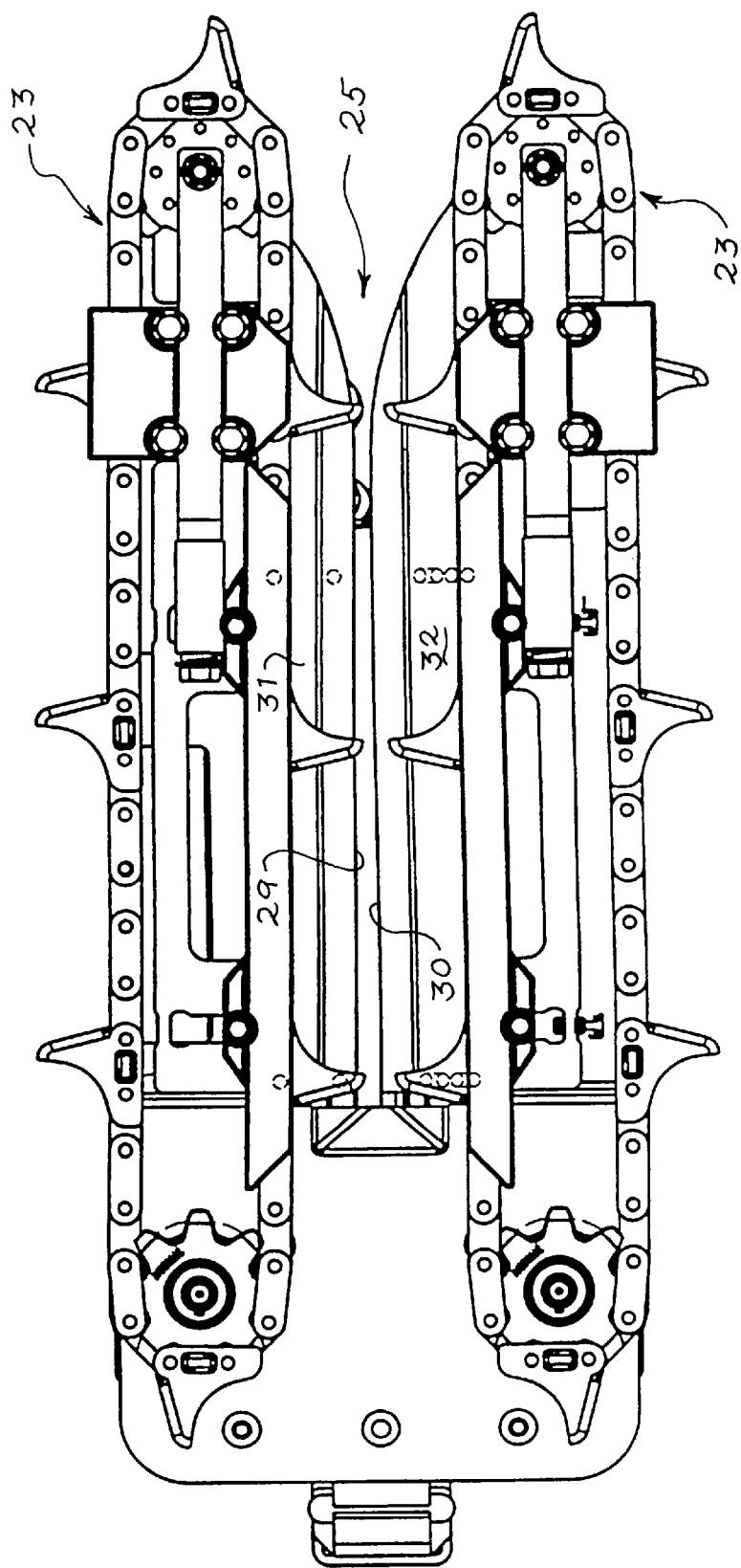
FIG. 3 is a top plan view of the row unit seen in FIG. 2.

Referring now also to FIGS. 2 and 3, a row unit 15 is shown removed from the header assembly 12. The row unit 15 gathers corn stalks into it as it moves forwardly along a row of corn.

Each row unit 15 includes a U-shaped frame 20 on which a pair of gathering chain assemblies 23 are mounted for endless circulation in paths parallel to each other. The gathering chain assemblies 23, each of which includes a series of gathering fingers 24, are designed to draw the stalks into a gap 25 defined between the opposed edges 29 and 30 of stripper plates 31 and 32, respectively. Snapping rolls (not shown) beneath the stripper plates 31 and 32 pull the corn stalks downwardly through the gap 25 and the ears of corn are stripped off of the stalks by the plates edges 29 and 30 as the stalks are pulled downwardly between them.

The gathering fingers 24 carry the stripped ears of corn rearwardly into to the trough 17. There they are deposited and conveyed by the augur 16 to the feeder assembly 13. The stripped corn stalks are deposited on the ground by the row unit 15 as it moves on through the field.

The stripper plates 31 and 32 are substantially identical in plan configuration. Their opposed edged 29 and 30, respectively, define the gap 25. The stripper plate 31 is bolted in fixed relationship to the U-shaped frame 20. The other stripper plate 32 is mounted in a manner which allows for transverse movement toward and away from the plate 31.

Figure 4:
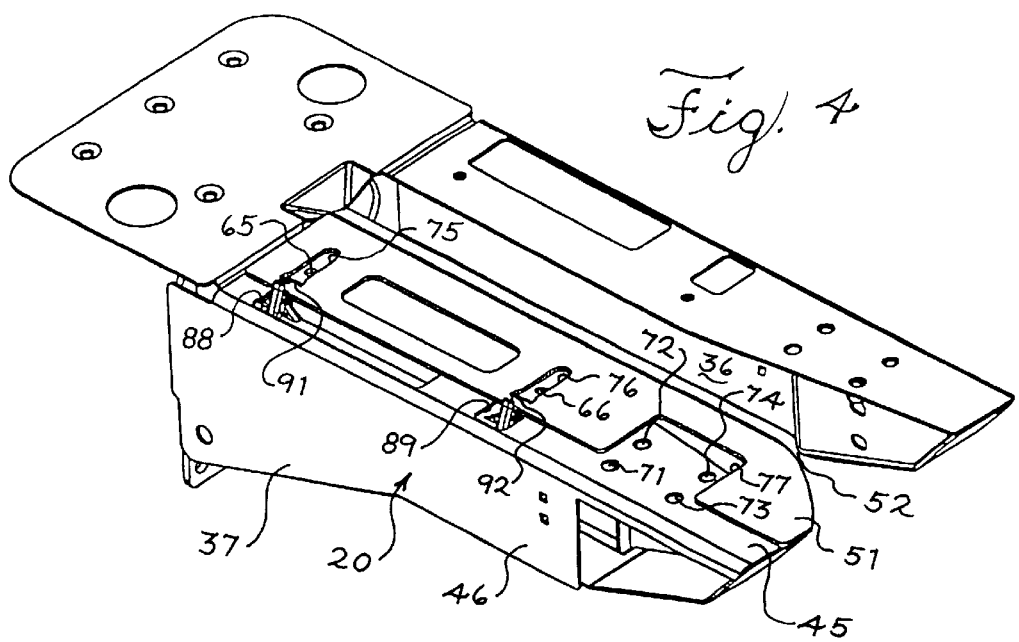
FIG. 4 is a perspective view, similar to FIG. 2, showing the row unit frame and adjustable stripper plate arrangement, with the snapping rolls and gathering chains and their drive elements removed.

Referring now to FIG. 4, the frame 20 is shown with the stripper plate 32 mounted on its right side section 37, and other components removed. The frame side sections 36 and 37 are identical to each other, although in mirror image construction, i.e., they oppose each other, but only the right side section 37 will be described in explaining the construction and operation of the present invention.

The right side section 37 of the frame 20 includes a top plate 45 on which the stripper plate 32 is slidably mounted. The top plate 45 is horizontal and flat. A side plate 46 forms the outer wall of the section 37. A side plate 47 (see FIG. 5) forms the inner wall.

The stripper plate 32 includes a longitudinally extending, horizontal panel 51 which rests on the plate 45. It also includes a longitudinally extending, downwardly inclined panel 52 disposed inwardly of the top plate 45. The stripper plate edge 30 defines the innermost edge of this inclined panel 52.

The stripper plate 32 is held against the plate 45 by the guide and idler assembly 48 for the chain 23 above it. In this regard, the corresponding gathering chain guide and idler assembly 48 is fastened to the frame section 37 with a pair of longitudinally spaced bolts 55, 56 (see FIG. 2) and group of four bolts 61, 62, 63 and 64 spaced forwardly of the pair of bolts 55, 56.

Referring specifically to FIG. 4, the bolts 55, 56 are received in corresponding threaded apertures 65, 66 in the top plate 45. The bolts 61, 62, 63, 64 are received in corresponding threaded apertures 71, 72, 73 and 74 in the plate 45.

The bolts 55, 56 pass through transversely elongated slots 75 and 76 in the stripper plate 32. The bolts 61, 62, 63 and 64 press through a transversely extending cut-out 77 in the stripper plate 32. The chain assembly 23 is fixed at a position slightly above the stripper plate 32 by spacers (not shown) on the bolts 55 and 56. Thus, the stripper plate 32 is securely held on the top plate 45 of the frame section 37 but free to slide transversely of the frame section, toward and away from the stripper plate 31.

Figure 5:
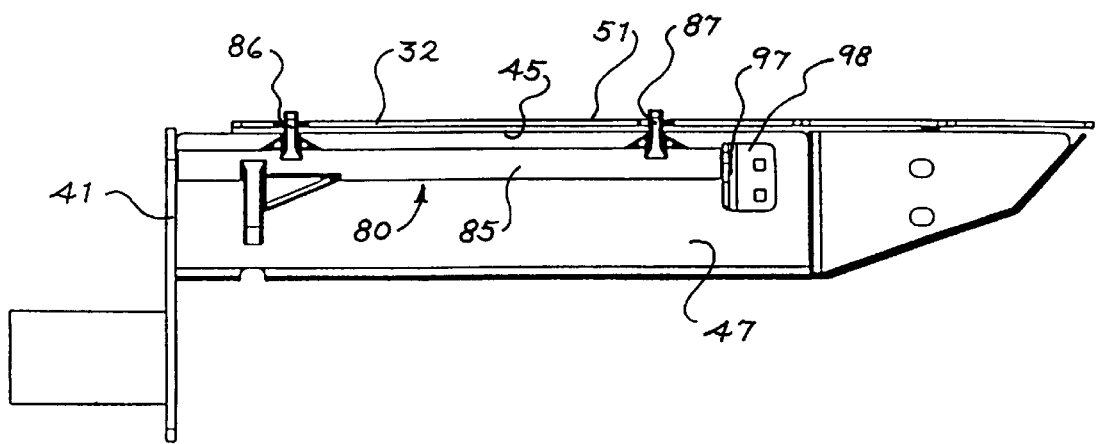
FIG. 5 is a side elevational view of the row unit frame seen in FIG. 4; with a side plate removed to show the adjustment mechanism.
Figure 6:
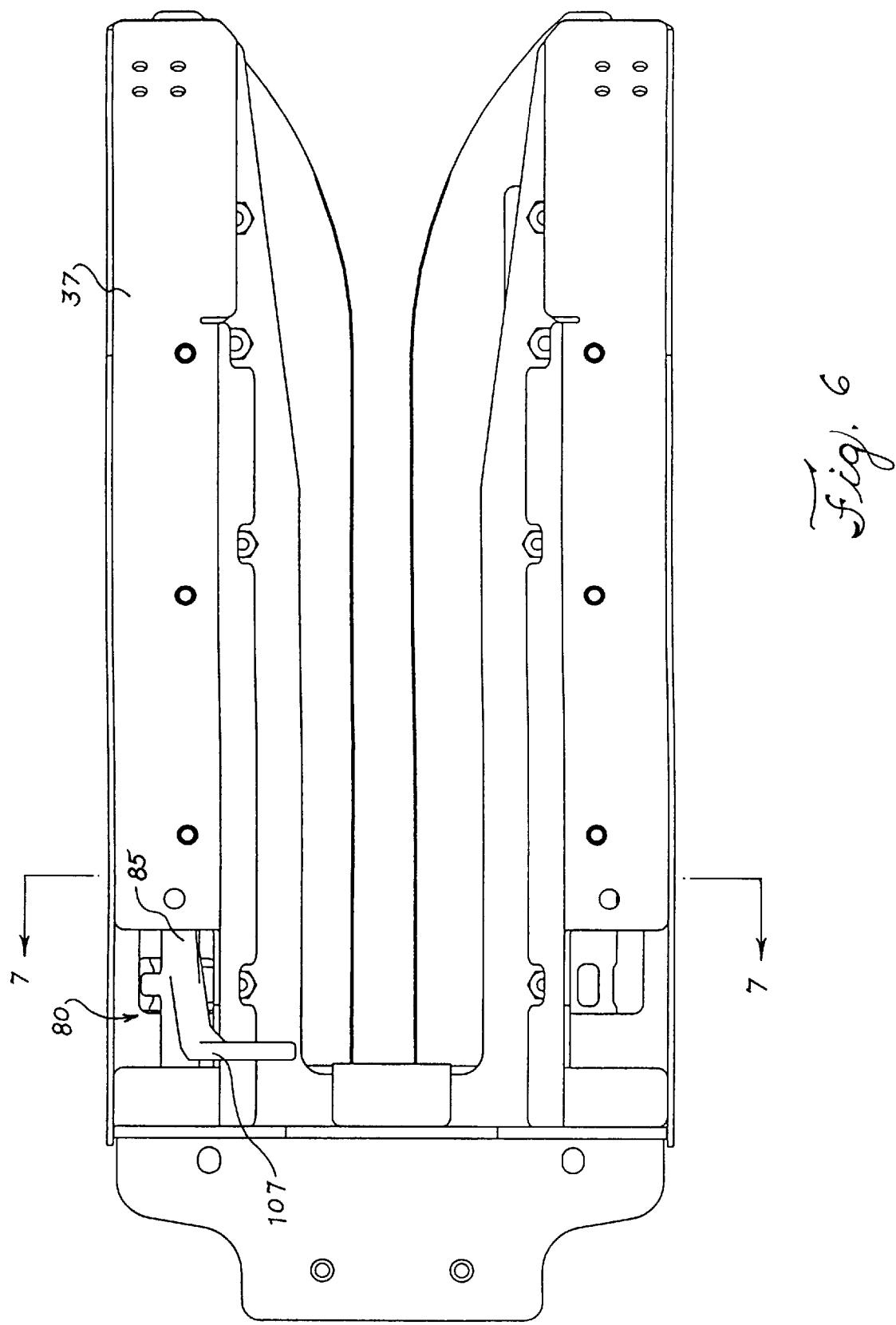
FIG. 6 is a bottom plan view of the row unit seen in FIGS. 4 and 5.
Figure 7:
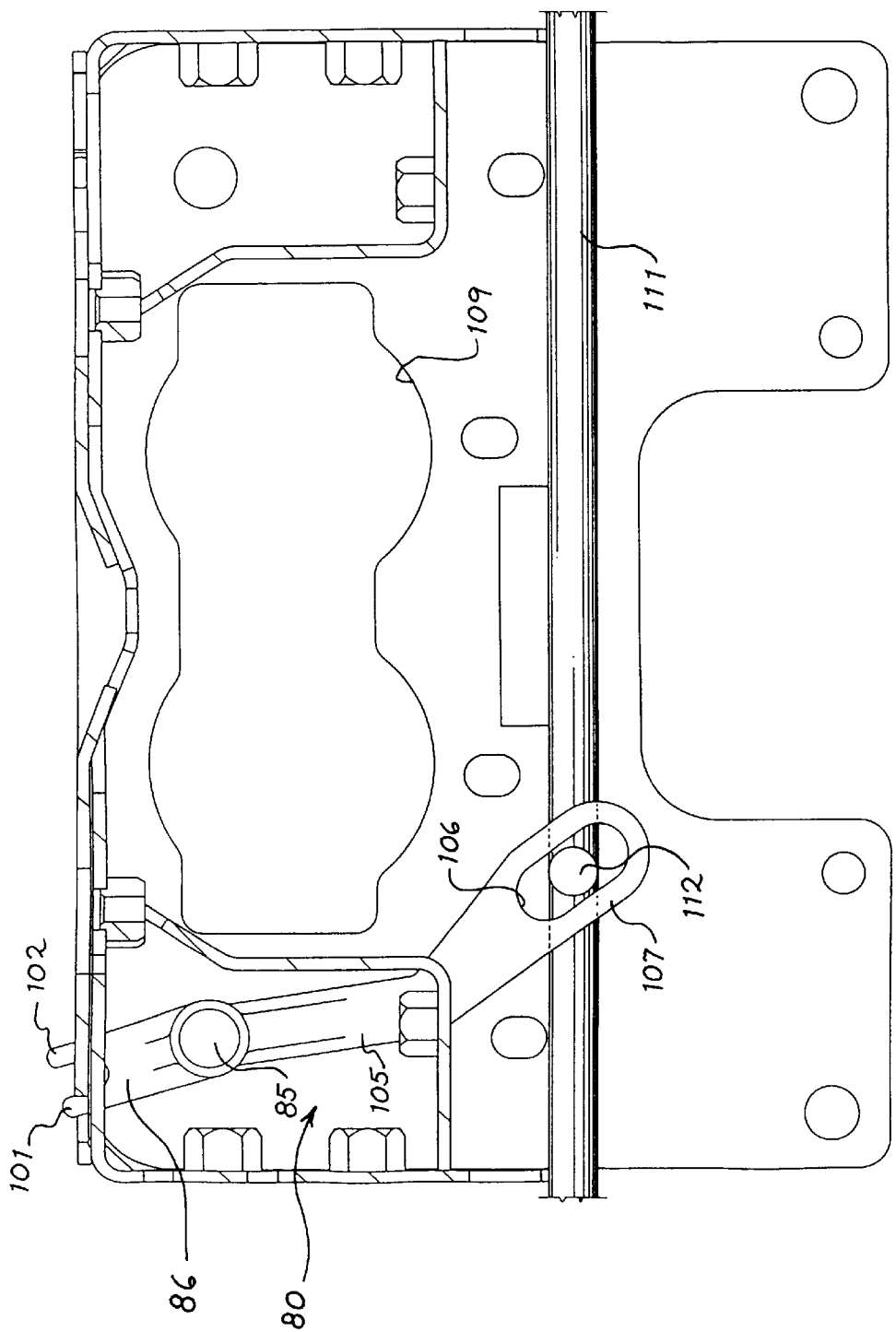
FIG. 7 is a sectional view taken along line 7—7 of FIG. 6.

Referring now to FIGS. 5–7, in addition to FIG. 4, the position of the stripper plate 32 is adjusted transversely of the frame section 37 by a stripper plate adjustment mechanism 80. The adjustment mechanism 80 includes an actuator torque shaft 85 mounted inside the frame section 37, two actuator arms 86 and 87 which extend radially outwardly from the shaft 85 and protrude through cut-outs 88 and 89, respectively, in the section top plate 45, and cooperating stripper plate segments 91 and 92 formed in the stripper plate 32.

The rear end of the torque shaft 85 is journaled in the back wall plate 41 of the frame section 37 at 95, immediately below the top plate 45. The front end of the torque shaft 85 is journaled at 97 in a bracket 98 fastened to the inner side wall plate 47 of the right side section 37.

Extending upwardly from the shaft 85 at longitudinally displaced locations are the actuator arms 86 and 87. Each of the arms 86 and 87 has a pair of spaced actuator fingers 101, 102 formed at its free end, as best seen in FIG. 7 (only arm 86 is shown, but arm 87 is identical).

The pair of actuator fingers 101, 102 in each actuator arm 86 and 87 extend through corresponding cut-outs 88 and 89 in the roof plate 45. Above these cut-outs, each pair of actuator fingers 101, 102 extend into bracketing relationship with a corresponding stripper plate segment 91 and 92 formed in the stripper plate 32, ie., the fingers of each arm 86 and 87 capture a stripper plate segment 91 or 92 between them.

Extending downwardly from the shaft 85, between the actuator arm 86 and the back wall plate 41 of the frame 37, is an actuator lever 105 formed integrally with the shaft. The lever 105 has a lost-motion drive slot 106 formed in its lower end 107, which extends below the aforementioned snapping rolls (not shown) in the assembled row unit 15. In this regard, the position of the snapping rolls may be visualized by reference to the cut-out 109 in the back wall 41 of the frame section 37 through which they are driven.

The lever 105 is connected at its lower end 107 to a control rod 111 which extends transversely through the row unit 15, as seen in FIG. 7. The rod is connected to the lever 105 in lost-motion relationship by a pin or bolt 112 which protrudes from the side of the rod (or is clamped to it) and extends through the drive slot 106.

The control rod 111 extends across the entire cornhead 12, through each row unit 15. By adjusting the position of the rod 111 transversely of the cornhead 12, the position of the stripper plate 32 on every row unit 15 can be adjusted at the same time.

The invention has been described in the context of adjusting the position of a single stripper plate 32 in each row unit 15. However, it might also be applied to the other stripper plate 31, making both of them adjustable. Also, the stripper plate 32 has been described as having its edge 30 formed as a downwardly inclined panel 52. However, the panel 52 could also be co-planar with the panel 51 (with the configuration of the plate 31 being identical).

While a preferred embodiment of the invention has been described, it should thus be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A row unit for a cornhead, comprising:
    a) a frame including a pair of longitudinally elongated side frame sections extending generally parallel to each other;
    b) a stripper plate mounted on top of at least one of said side frame sections for movement transversely of said one side frame section;
    c) an actuator including a torque shaft inside said one frame section, extending longitudinally thereof and underlying said stripper plate;
    d) said actuator also including an actuating arm extending radially from said torque shaft, upwardly out of said one side frame section into operative engagement with said stripper plate;
    e) said torque shaft being rotatable about its axis so as to cause said actuating arm to move through an arc transversely of said one side frame section and, in doing so, to move said stripper plate transversely of said one side frame section.

2. The row unit of claim 1 further characterized in that:
    a) said actuating arm has a pair of transversely spaced actuator fingers at its free end;
    b) said stripper plate including a plate segment extending longitudinally of said plate;
    c) said plate segment being bracketed by the fingers of said pair of fingers.

3. The row unit of claim 2 further characterized in that:
    a) said actuator includes an actuator lever extending radially from said torque shaft; and
    b) a control rod extends transversely through said frame section below said torque shaft,
    c) said actuator lever being connected to said rod in lost motion relationship.

4. The row unit of claim 2 further characterized in that:
    a) said actuator includes another actuating arm extending radially from said torque shaft, upwardly out of said one side frame section into operative engagement with said stripper plate, said actuating arms being substantially identical in configuration.

5. The row unit of claim 2 further characterized in that:
a) said plate segment is defined between cut-outs through said stripper plate.

6. The row unit of claim 4 combination with a another row unit which is substantially identical in configuration, said control rod extending transversely through each of said row units.

* * * * *